UNITED STATES PATENT OFFICE.

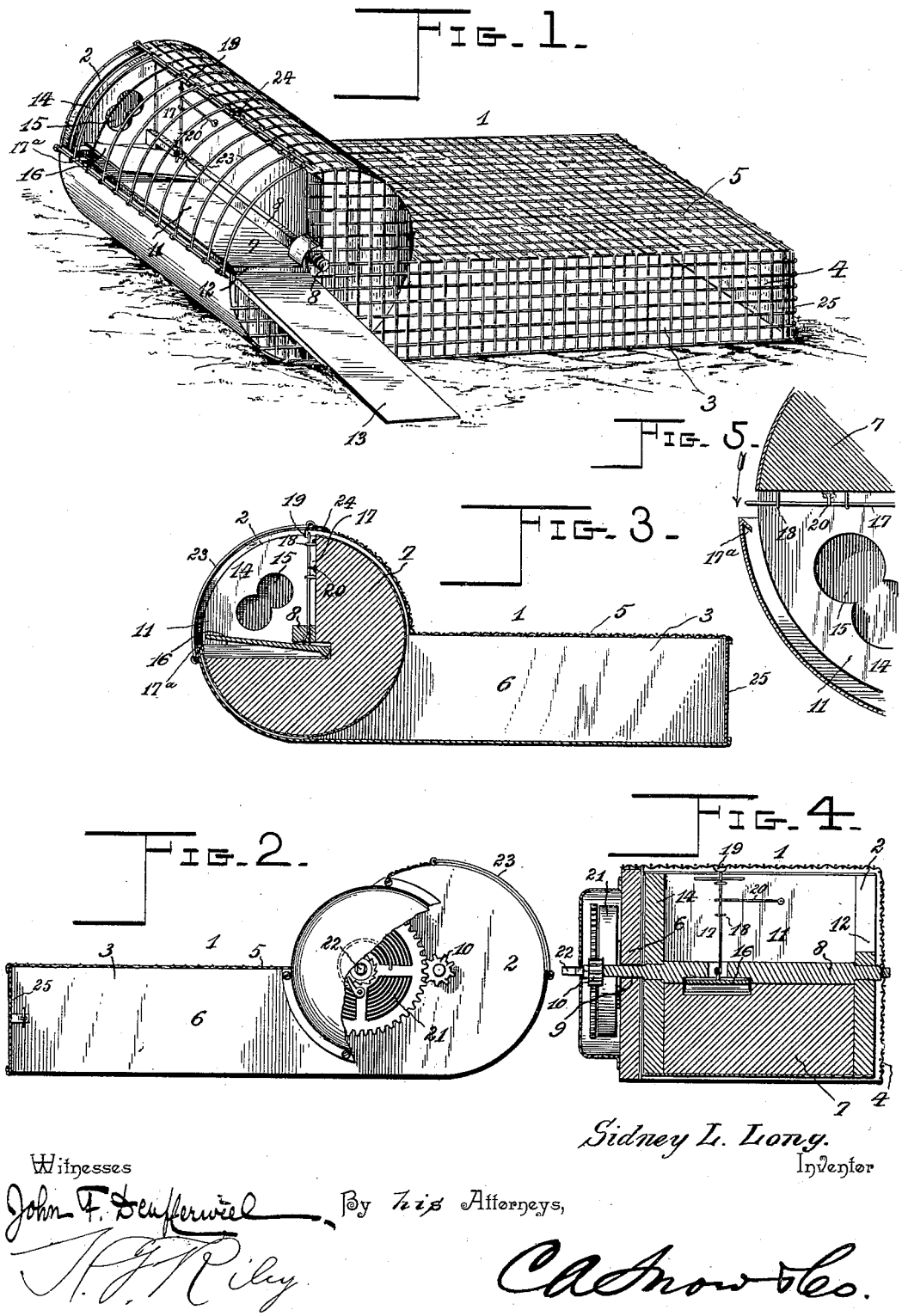

SIDNEY L. LONG, OF MAGNOLIA, MINNESOTA, ASSIGNOR OF ONE-HALF TO LIONEL C. LONG, OF SAME PLACE.

ANIMAL-TRAP.

SPECIFICATION forming part of Letters Patent No. 616,242, dated December 20, 1898.

Application filed February 14, 1898. Serial No. 670,260. (No model.)

*To all whom it may concern:*

Be it known that I, SIDNEY L. LONG, a citizen of the United States, residing at Magnolia, in the county of Rock and State of Minnesota, have invented a new and useful Animal-Trap, of which the following is a specification.

The invention relates to improvements in animal-traps.

The object of the present invention is to improve the construction of that class of animal-traps known as "self-set" and "ever-set" traps and to provide a simple, inexpensive, and efficient one which will be positive and reliable in operation and adapted to capture a number of animals successively without replenishing the bait.

The invention consists in the construction and novel combination and arrangement of parts, as hereinafter fully described, illustrated in the accompanying drawings, and pointed out in the claims hereto appended.

In the drawings, Figure 1 is a perspective view of an animal-trap constructed in accordance with this invention. Fig. 2 is a side elevation, partly in section, illustrating the arrangement of the gearing and actuating-spring. Fig. 3 is a longitudinal sectional view. Fig. 4 is a transverse sectional view. Fig. 5 is a detail view showing the construction for locking the drum against backward rotation.

Like numerals of reference designate corresponding parts in the several figures of the drawings.

1 designates an animal-trap having a cylindrical front casing 2 and provided with a cage 3, located in rear of the cylindrical casing 2 and forming a receptacle for captured animals. The side 4 and top 5 are constructed of open iron-work or similar material adapted to afford light and ventilation and enable the interior to be inspected, and the other side 6 is preferably solid.

Within the cylindrical casing is arranged a rotary drum 7, mounted on a shaft 8, which has its ends formed into journals, the journal 9 at one side of the trap being extended and provided with a pinion 10. The rotary drum is provided with an animal-receiving chamber 11, quadrant-shaped in cross-section and presenting a horizontal bottom or floor and a vertical inner or rear wall. The chamber, which is closed at its inner end, has its outer end open and normally registering with a quadrant-shaped opening or doorway 12, forming an entrance to the trap. The trap is provided at the side 3 with an inclined platform 13, leading to the entrance 12 and adapted to enable animals to readily pass into the chamber of the rotary drum.

The wall 14, at the inner end of the chamber 11, is provided with a bait-receiving recess 15, and adjacent to the end wall is arranged a treadle 16, hinged at its inner end adjacent to the rear wall of the chamber 11 and adapted to be depressed by an animal in attempting to reach the bait. The treadle, which is mounted in a suitable recess of the floor or bottom of the chamber of the rotary drum, is normally substantially flush with the face of the said floor or recess, and as it is depressed before an animal can obtain access to the bait the trap does not have to be rebaited after each operation and a single bait will serve for a number of captures.

The rotary drum is locked in position for receiving an animal by a catch 17, consisting of a reciprocating rod arranged in suitable guides 18 and connected at its lower end with the treadle. The upper end of the rod is arranged to engage a projection or stop 19, depending from the wall at the top of the cylindrical casing. The reciprocating rod is engaged by a spring 20, which is mounted on the rear wall of the chamber 11 and adapted to maintain the treadle elevated and the catch extended and in position for engaging the stop 19.

The drum when tripped is rotated by the weight of the animal and also by the action of a barrel-spring 21, mounted on the exterior of the closed side of the trap, having one end secured to the same and its other end connected with a winding-shaft 22. A gear-wheel is mounted upon the winding-shaft 22 and meshes with the pinion 10, so that the barrel-spring is adapted to rotate the drum positively. The winding-shaft is connected with the gear-wheel by a clutch of the ordinary construction, and the drum is adapted to be sprung and automatically reset until the spring runs down.

The drum is locked against complete retrograde rotation by a resilient catch 17ª, which is adapted to prevent the escape of animals from the trap after the spring has run down and which consists of an inclined projection extending downward from the front of the cylindrical casing. The inclined catch 17ª, which may be formed integral with the casing or be secured to the same, is located in the path of the catch 17, which is adapted in the forward rotation of the drum to pass the catch 17ª readily, but which is adapted in the retrograde rotation of the drum to engage the lower end of the inclined catch and prevent the chamber 11 from moving backward sufficiently to bring it opposite the entrance of the trap.

The cylindrical casing is provided at its front with a series of curved wires 23, forming the front and a portion of the top wall and permitting the interior of the chamber to be clearly seen, so that an animal is not deterred from entering the trap and attempting to obtain the bait. Sufficient space is left between the ends of the drum and the sides of the casing to prevent the tail of the rat or other animal from becoming caught between the parts and interfering with the operation of the trap. The curved section formed by the wires 23 is hinged at its lower edge to the front of the casing and is secured at its upper edge by a catch 24, which permits the curved section to be swung downward to afford ready access to the chamber 11 and the bait-recess. The cage is provided at its back with a sliding door 25, mounted in suitable guides of the top and bottom of the cage; but the latter may be provided with any other form of door desired. This door 25 enables the captured animals to be readily discharged from the cage.

The invention has the following advantages: The trap is simple and comparatively inexpensive in construction, it is positive and reliable in operation, and it is capable of effecting a series of successive captures without removing the bait. Provision is also made for preventing the tail of an animal from becoming caught between the rotary drum and the open side of the trap, so that the latter will not become clogged and refuse to operate.

Changes in the form, proportion, and minor details of construction may be resorted to without departing from the spirit or sacrificing any of the advantages of this invention.

What I claim is—

1. In an animal-trap, the combination of a cage provided at its front with a cylindrical casing having an opening at one end, a rotary drum journaled in the cylindrical casing and provided with a quadrant-shaped recess or chamber, adapted to register with the opening of the casing, the rest of the drum being solid and adapted to close the adjacent end of the cage, means for positively rotating the drum, and tripping mechanism for releasing the drum to cause the same to rotate, substantially as described.

2. In an animal-trap, the combination of a casing provided at one side with an entrance-opening, a rotary drum mounted in the casing and provided with a chamber having a bait-receptacle at the inner end thereof, a catch normally locking the drum against rotation, a treadle connected with the catch and mounted at the bottom of the drum at a point between the bait-receptacle and the outer end of the chamber, and means for positively rotating the drum, substantially as described.

3. In an animal-trap, the combination of a cylindrical casing provided at one end with an opening, a drum journaled in the casing and provided with a chamber closed at its inner end and open at its outer end, the inner end being adapted to receive a bait, a treadle mounted in the chamber at the floor thereof and interposed between the inner end and the entrance of the trap, a spring-actuated catch connected with the treadle and normally locking the drum against rotation, a spring for actuating the drum, and gearing connecting the spring with the drum, substantially as described.

4. In an animal-trap, the combination of a cylindrical casing provided at one end with an entrance-opening and having the curved open-work section arranged at the front and top of the casing, said section being hinged and adapted to open to afford access to the trap, a rotary drum provided with a chamber and mounted in the casing, a cage connected with the casing, and means for tripping and rotating the drum, substantially as described.

5. In an animal-trap, the combination of a casing provided at one end with an opening, a drum journaled in the casing and provided with a chamber adapted to register with the opening of the casing, a catch mounted at the top of the chamber and adapted to engage the casing to lock the drum against forward rotation in setting the trap, means for tripping the drum, and a catch mounted on the casing in the path of the said catch and adapted to be engaged by the same in the backward movement of the drum, whereby the chamber is prevented from being carried backward opposite the entrance-opening of the casing, substantially as described.

In testimony that I claim the foregoing as my own I have hereto affixed my signature in the presence of witnesses.

SIDNEY L. LONG.

Witnesses:
   P. PHINNEY,
   A. H. TURNER,
   E. GOODENOUGH.